United States Patent
Vandezande et al.

(10) Patent No.: US 11,074,586 B2
(45) Date of Patent: Jul. 27, 2021

(54) METHODS AND APPARATUSES FOR FRAUD HANDLING

(71) Applicant: Sony Corporation, Tokyo (JP)

(72) Inventors: Bart Vandezande, Stuttgart (DE); Conor Aylward, Stuttgart (DE); Cristian Traum, Stuttgart (DE); Erbin Lim, Stuttgart (DE); Barbara Jochems, Stuttgart (DE); Olivier Elshocht, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/359,033

(22) Filed: Mar. 20, 2019

(65) Prior Publication Data
US 2019/0295090 A1    Sep. 26, 2019

(30) Foreign Application Priority Data
Mar. 26, 2018 (EP) ................................ 18164061

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC ........ G06Q 40/00; G06Q 10/00; G06Q 20/40; H04L 9/00; G06N 20/00
See application file for complete search history.

(56) References Cited

U.S. PATENT DOCUMENTS

| 8,078,515 | B2 | 12/2011 | John |
| 2002/0010684 | A1* | 1/2002 | Moskowitz ......... G06Q 20/085 705/75 |
| 2007/0267476 | A1 | 11/2007 | Perreard |
| 2008/0195540 | A1 | 11/2008 | Gee et al. |
| 2009/0222243 | A1 | 9/2009 | Zoldi et al. |
| 2010/0094767 | A1 | 4/2010 | Miltonberger |

(Continued)

FOREIGN PATENT DOCUMENTS

WO     2016/090322 A1     6/2016

OTHER PUBLICATIONS

Extended European Search Report dated Jun. 3, 3019, issued in corresponding European Patent Application No. 19159877.0.

(Continued)

*Primary Examiner* — Olabode Akintola
*Assistant Examiner* — Suckhwan Chon
(74) *Attorney, Agent, or Firm* — Xsensus LLP

(57) ABSTRACT

The present disclosure relates to a concept of fraud handling. A data transaction request is received via a data network from at least one user account. The data transaction request is analyzed based on predefined fraud detection rules to generate a fraud score associated with the at least one user account. The at least one user account is classified as fraudulent account if the associated fraud score exceeds a predefined fraud likelihood threshold. Data transactions associated with a classified fraudulent account via the data network are done by purposely deteriorating the data transactions associated with the classified fraudulent account in comparison to data transactions associated with a classified non-fraudulent account.

7 Claims, 3 Drawing Sheets

(56) References Cited

U.S. PATENT DOCUMENTS

| | | |
|---|---|---|
| 2013/0013514 A1 | 1/2013 | Mackouse |
| 2015/0026027 A1* | 1/2015 | Priess ................ G06Q 20/4016 |
| | | 705/35 |
| 2015/0212843 A1 | 7/2015 | Turgeman et al. |
| 2016/0162895 A1* | 6/2016 | Nuzum .............. G06Q 20/3226 |
| | | 705/44 |
| 2017/0111364 A1 | 4/2017 | Rawat |
| 2019/0164173 A1* | 5/2019 | Liu ....................... H04L 63/168 |

OTHER PUBLICATIONS

Richhariya et al., "An Approach to Detect Fraud at Account Level", International Journal of Engineering Trends and Technology (IJETT), vol. 31, No. 3, Jan. 2016, pp. 159-163.

\* cited by examiner

METHODS AND APPARATUSES FOR FRAUD HANDLING

CROSS-REFERENCE TO RELATED APPLICATION

The present application claims priority to European Patent Application 18164061.6 filed by the European Patent Office on Mar. 26, 2018, the entire contents of which being incorporated herein by reference.

FIELD

The present disclosure relates to methods and apparatuses for handling fraudulent abuse of user accounts for data transactions, such as in data transactions related to e-commerce or the like.

BACKGROUND

In an increasingly connected world, both service providers, e.g. for e-commerce, and their users benefit from streamlined access and quick data transactions over data networks, such as the Internet. Prominent examples of such data transactions are online purchases of goods, software or services over e-commerce platforms. Unfortunately, the shift to digital communication and recordkeeping also gives fraudsters multiple entry points for abusing user accounts. A user account allows a user to authenticate to a service provider's system and potentially to receive authorization to access resources provided by or connected to that system. To log into an account, a user is typically required to authenticate oneself with a password or other credentials for the purposes of accounting, security, logging, and resource management, just to name a few examples. User accounts can be fraudulently (ab)used in various ways. For example, user credentials can be stolen and an account of a stolen user can be used for fraudulent purchases. For another example, fake user accounts of fake users can be set up for purchases with stolen credit cards. The fraud scenarios are manifold.

More and more online service providers need to react in real-time to offer the best possible user experience. For example, users should be able to setup new accounts or make digital purchases with no significant delay. This real-time requirement makes it easier for fraudulent user (fraudsters) to understand and reverse engineer how tools being used by the service providers detect fraudulent behavior work. Fraudsters can then better create strategies to bypass such fraud detection tools.

Hence, it is desired to make it more difficult for fraudsters to analyze and extract the behavior or patterns of fraud detection tools.

SUMMARY

This need is met by methods and apparatuses in accordance with the independent claims. Advantageous embodiments are addressed by the dependent claims.

According to a first aspect, the present disclosure provides a method of fraud handling. The method includes receiving, via a data network, a data transaction request from at least one user account, analyzing the data transaction request based on predefined fraud detection rules to generate a fraud score associated with the at least one user account, classifying the at least one user account as fraudulent account if the associated fraud score exceeds a predefined fraud likelihood threshold. Data transactions associated with a classified fraudulent account are performed purposely deteriorated compared to data transactions associated with a classified nonfraudulent account.

The present disclosure further provides an apparatus for fraud handling. The apparatus comprises a receiver which is configured to receive, via a data network, a data transaction request from at least one user account. The apparatus also comprises processor circuitry configured to analyze the data transaction request based on predefined fraud detection rules to generate a fraud score associated with the at least one user account, to classify the at least one user account as fraudulent account if the associated fraud score exceeds a predefined fraud likelihood threshold, and to perform data transactions associated with a classified fraudulent account via the data network by purposely deteriorating the data transactions associated with the classified fraudulent account in comparison to data transactions associated with a classified non-fraudulent account.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
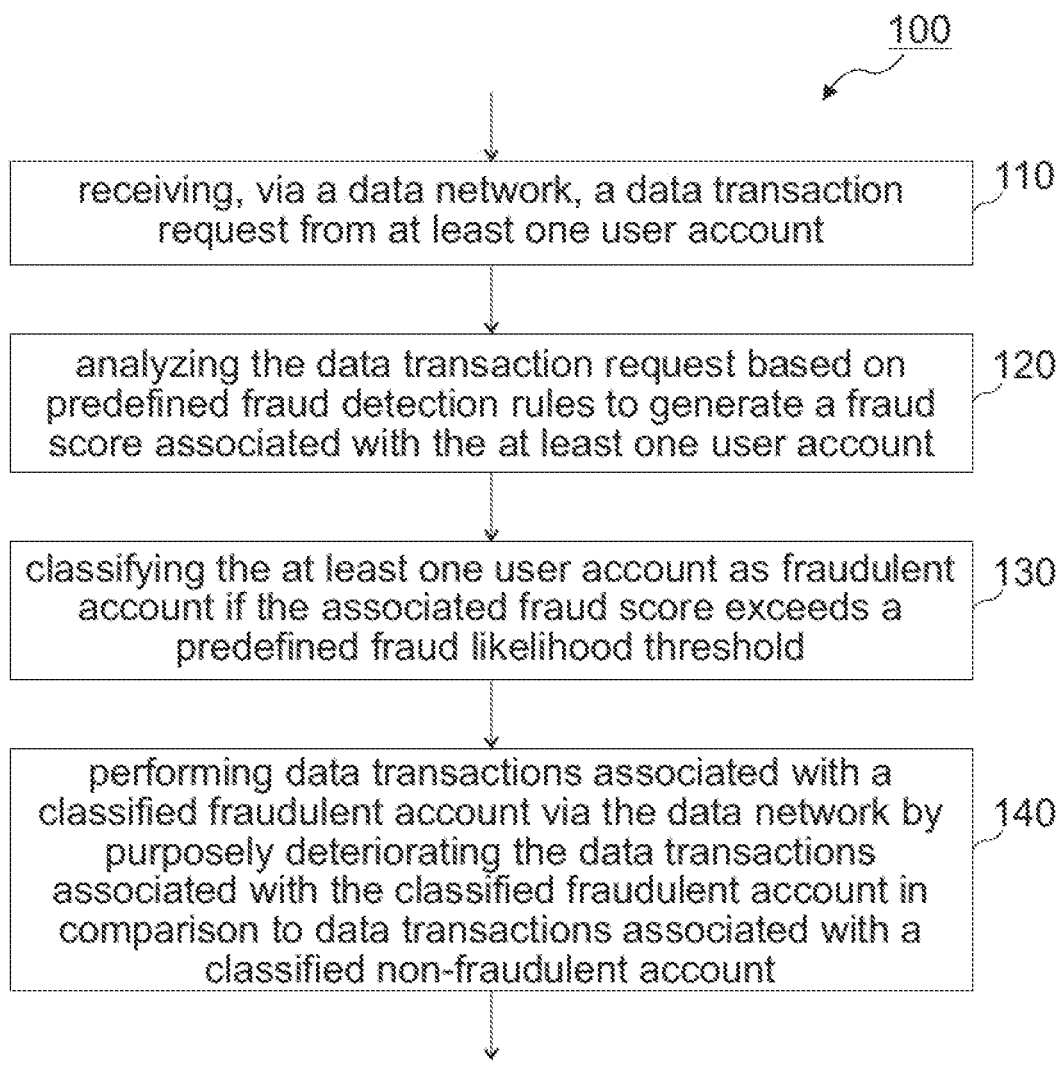
FIG. 1 shows a flowchart of a method of fraud detection according to an embodiment of the present disclosure.

Various examples will now be described more fully with reference to the accompanying drawings in which some examples are illustrated.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Recently, online retail fraud attempts have grown drastically. While nothing can stop some criminals from fraudulent behavior, fraudsters can still be fought back. There are various fraud detection concepts, reaching from manual fraud detection policies to fully automated fraud detection, that can prevent e-commerce and/or e-banking fraud and secure online service providers and/or banks against revenue losses.

Various anti-fraud or fraud detection tools are based on a similar principle: a user sends a data transaction request, e.g. containing order details, to a service provider. A fraud detection mechanism screens the data transaction request for risk factors and returns an alert in the form of a risk score and/or an "approve/decline" response. To detect a possible financial fraud, multiple warning signs can be analyzed, e.g. different shipping and billing addresses, repetitive orders of the same item, big-ticket orders overseas, etc.

For example, more advanced fraud detection tools can be based on machine learning where real-time insights can be fed into machine learning models that can detect fraudulent behavior instantly. Compared to manual or human fraud detection reviews, machine learning can provide more speed and can embrace a wider range of online fraud signals. The skilled person having benefit from the present disclosure will appreciate, however, that various concepts and rules of fraud detection can be employed, reaching from purely manual concepts based on human judgement over semiautomated to fully automated approaches, such as machine learning.

Thus, a fraud detection tool can be a set of human defined rules running locally in an online business, a machine learning model trained on past fraud behaviors, or an online scoring service that is called by the online business to detect fraud.

In either case predetermined fraud detection rules or models can be applied by a fraud detection mechanism to identify fraudulent behavior patterns. If, based on the fraud detection rules and/or the fraud detection model(s), a user account is classified as a fraudulent user account, this account typically gets blocked. That is to say, no data transactions can be performed via the fraudulent account, the service is blocked for the fraudulent user account. Fraudsters can analyze potential fraud detection strategies employed by the detection tool and come up with strategies to bypass the rules or models underlying the fraud detection tools. For example, they can quickly set up new and/or modify accounts with a different combination of fake account or user data until they find a new combination that does not (yet) get classified as fraudulent account. When fraud scoring shows a repetitive blocking behavior a fraudster might discover the exact behavior (the set of rules) that causes his account(s) to be blocked. This knowledge might help to circumvent a potential high fraud score and prevent a potential ban of the account. Since the business replies in real-time it may be possible for the fraudster to understand the behavior very quickly by trying many different attack permutations.

The present disclosure addresses this issue and describes how to make it more difficult for a fraudster to benefit from his/her fraudulent behavior.

FIG. 1 shows a schematic flowchart of a method 100 of fraud handling in accordance with an embodiment of the present disclosure.

The method 100 is illustrated from a service provider's perspective. Method 100 includes an act 110 of receiving a data transaction request from or via at least one user account via a data network. Next, the received data transaction request gets analyzed (act 120) based on fraud detection rules and/or models to generate a fraud score associated with the at least one user account. If the associated fraud score exceeds a certain fraud likelihood threshold, the at least one user account is classified (act 130) as fraudulent account. Then, according to an embodiment of the present disclosure, data transactions associated with a classified fraudulent account are not blocked but allowed with some deterioration (act 140), meaning that data transactions associated with the classified fraudulent account are purposely deteriorated/degraded compared to data transactions associated with a classified non-fraudulent account. By offering a deteriorated version of the service or product, damage done by fraudsters can be reduced.

In some embodiments, the data network can be the Internet. However, the skilled person having benefit from the present disclosure will appreciate that also any other public or private data networks are conceivable. The data transaction request can be an online payment request including credit card or other bank account information of a user, for example. User data of the data transaction request can be analyzed using a set of predefined fraud detection rules (e.g., statistical techniques) or based on one or more intelligent fraud detection machine learning models (artificial intelligence). Thus, the act of analyzing 120 the data transaction request can comprise feeding the data transaction request from the at least one user account into a machine learning model which is configured to recognize fraudulent data transactions.

The fraud score generated by the fraud detection scheme can indicate a low, medium, or high probability of fraudulent usage, for example. Conventionally, user accounts having a low fraud score do not get blocked and get served unrestrictedly, while at least user accounts with high fraud scores conventionally get blocked. That is to say, conventionally there is a direct relation between fraud score and account blocking (e.g., a high fraud score leads to a blocked user account). From such blocking behavior, however, it may be possible for the fraudster to understand the behavior very quickly by trying many different attack permutations.

The present disclosure proposes to intentionally not completely block all identified or classified fraudster accounts to obfuscate the behavior of the fraud detection tool. That is, even user accounts with high or very high fraud scores do not get blocked. Instead, fraudulent accounts are offered deteriorated services/data transactions. The underlying contention is that if fraudsters cannot achieve a positive return on invest (ROI) they will be forced to stop attacks against the business.

Note that classified fraudulent accounts and/or data transaction that are intentionally not blocked can still be flagged as fraudulent. In embodiments, the unblocked fraudulent accounts can be offered a tempered/deteriorated version of the service or good (e.g., "service unavailable", "tempered game environment" which does not allow a puzzle, challenge, etc. to succeed, etc.). That is, data transactions or data content associated with a classified fraudulent account can be purposely degraded or impaired. Such deterioration of the data transactions or related software can comprise at least one of purposely using a higher latency for data communication, purposely sending more unreliable responses, pretending service unavailability, or purposely communicating deteriorated data content. Many other service deteriorations are conceivable. In one example, different types of deterioration may be used for a first fraudulent user account and a second fraudulent user account. In another example, different types of deterioration may be used for a first data transaction and a second data transaction. Both data transactions can be related to the same fraudulent user account or to different fraudulent user accounts. This service deterioration without being able to identify the reason can cause massive frustration to the fraudster.

Figure 2:
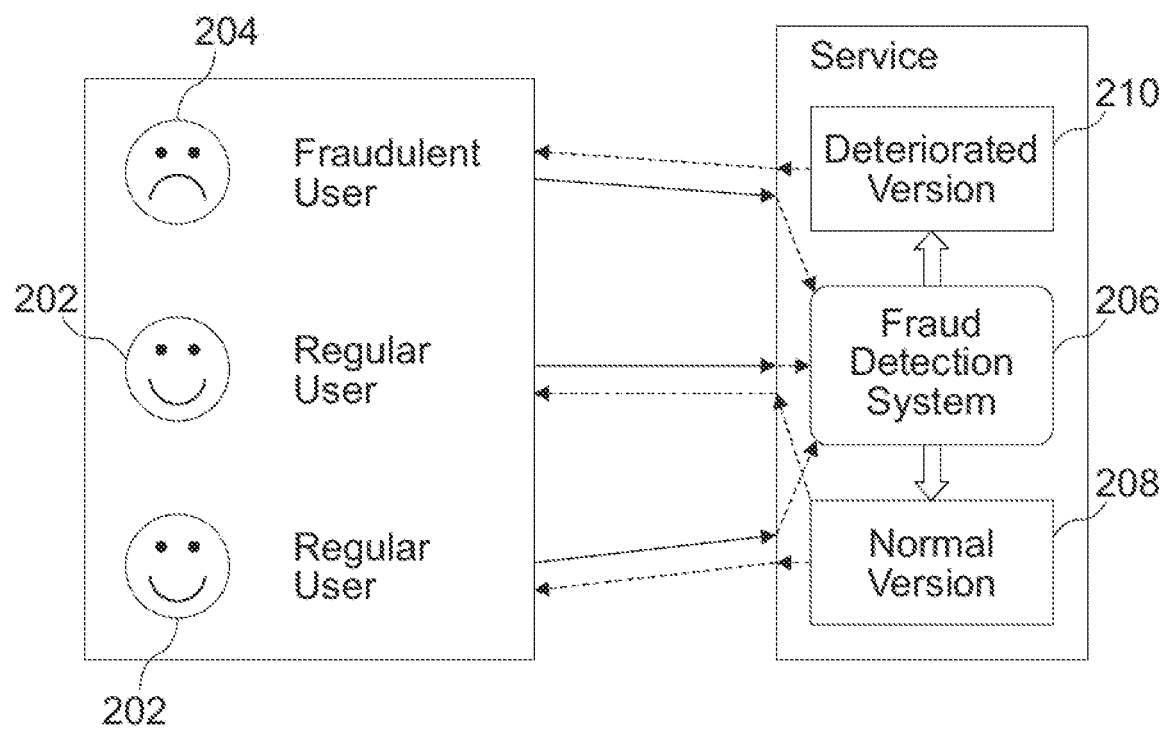
FIG. 2 illustrates a concept of service deterioration for fraudulent user accounts.

FIG. 2 illustrates an example scenario how embodiments of the present disclosure may be employed.

Normal or regular users 202 map most of the time 1 to 1 with a respective user account in the system. A normal user account typically receives a low fraud score. A fraudulent user 204 can map to N user accounts or a group of user accounts which can exhibit substantially the same fraudulent behavior. These fraudulent accounts typically receive high fraud scores. As these accounts can be linked to the fraudster 204 based on a fraud detection scheme 206 using rules or artificial intelligence, an action taken based on the fraud score can offer a deteriorated/degraded version of the service or product that is being accessed or consumed with this fraudulent account. Non-fraudulent user accounts may be served normally (see reference numeral 208), while classified fraudulent user accounts can be served in a purposely deteriorated fashion (see reference numeral 210).

The knowingly allowed fraudulent accounts can be served with deteriorated operations. Examples of deteriorated operations are high latency, unreliable responses, service unavailability, offering an altered version of content (video content with glitches, unsolvable/crashing games, irritating noise added to music, apps blocking randomly, etc.).

By offering a deteriorated version of the service or product, damage done by permitted fraudulent accounts can be reduced. This makes it more difficult for the fraudster to detect that his/her account has been identified as being fraudulent. Thus, the fraudster might still continue with its original intend of misusing this account. But he will not be successful as the deterioration can prevent or alter the successful use of the services, consumables (e.g. altered version of content), etc.

A consideration which can be made is that the amount of fraudulent behavior allowed should be balanced so that it has a positive influence on the return on investment of the service owner and a negative for the attacker.

The attacker will have a cost for:
setting up a new fraud operation
figuring out what fraud works and what fraud not
The service owner will have a cost for:
allowing a percentage of fraudulent traffic
adapting to a new fraud pattern
This cost function can be supplied by the business.

Embodiments of the present disclosure can bring discredit to the fraudster's reputation if the fraudster does not notice the failing behavior of the service and continues with its original bad intentions. If the original intent was to sell this account to another user this other user will suffer from the same deteriorated version. Or if the intention is to provide the account to another (group of) fraudster(s) the account might proof to be unusable for them as well.

Figure 3:
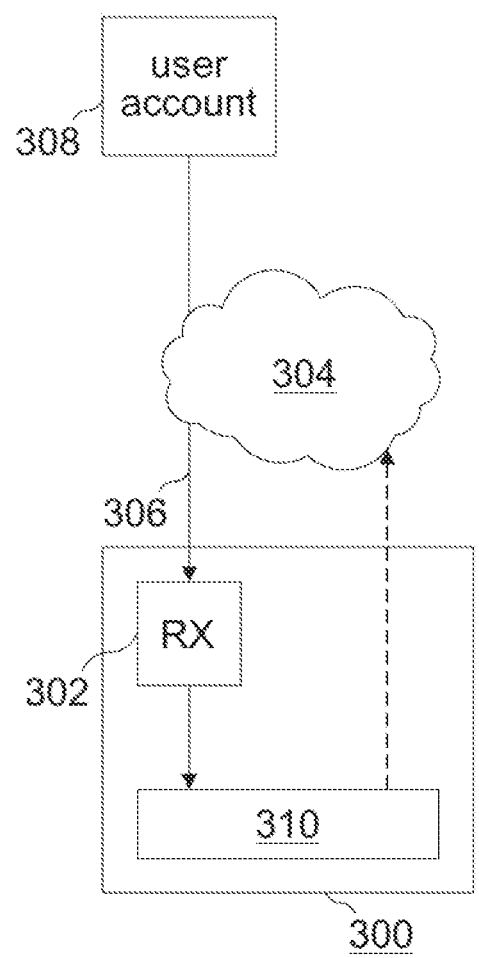
FIG. 3 shows a block diagram of an apparatus for fraud detection according to an embodiment of the present disclosure.

The skilled person having benefit from the present disclosure will appreciate that the described methods can be computer-implemented. An apparatus 300 for fraud handling is schematically illustrated in FIG. 3.

The apparatus 300 comprises a receiver 302 configured to receive, via a data network 304, a data transaction request 306 from at least one user account 308. A processor circuit 310 of the apparatus 300 is configured to analyze the received data transaction request 306 based on predefined fraud detection rules in order to generate a fraud score associated with the at least one user account. The processor circuit 310 is further configured to classify the at least one user account as fraudulent account if the associated fraud score exceeds a predefined fraud likelihood threshold and to pseudo-randomly permit or restrict data transactions associated with a classified fraudulent account via the data network. The processor circuit 310 is configured to permit data transactions associated with a classified fraudulent account via the data network 304 by purposely deteriorating the data transactions associated with the classified fraudulent account in comparison to data transactions associated with a classified nonfraudulent account.

The following examples pertain to further embodiments.
(1) A method of fraud handling, comprising
  receiving, via a data network, a data transaction request from at least one user account;
  analyzing the data transaction request based on predefined fraud detection rules to generate a fraud score associated with the at least one user account;
  classifying the at least one user account as fraudulent account if the associated fraud score exceeds a predefined fraud likelihood threshold; and
  performing data transactions associated with a classified fraudulent account via the data network by purposely deteriorating the data transactions associated with the classified fraudulent account in comparison to data transactions associated with a classified nonfraudulent account.
(2) The method of (1), wherein deteriorating the data transactions comprises at least one of purposely using a higher latency for data communication, purposely sending more unreliable responses, pretending service unavailability, or purposely communicating deteriorated data content.
(3) The method of any one of (1) to (2), wherein analyzing the data transaction request comprises feeding the data transaction request from the at least one user account into a machine learning model configured to recognize fraudulent data transactions.
(4) The method of any one of (1) to (3), wherein pseudo-randomly permitting or restricting data transactions comprises reacting in real-time to incoming data transaction requests.
(5) An apparatus for fraud handling, comprising
  a receiver configured to receive, via a data network, a data transaction request from at least one user account;
  a processor circuit configured to
  analyze the data transaction request based on predefined fraud detection rules to generate a fraud score associated with the at least one user account;
  classify the at least one user account as fraudulent account if the associated fraud score exceeds a predefined fraud likelihood threshold; and
  perform data transactions associated with a classified fraudulent account via the data network by purposely deteriorating the data transactions associated with the classified fraudulent account in comparison to data transactions associated with a classified non-fraudulent account.
(6) The apparatus of (5), wherein the processor circuit is configured to deteriorate the data transactions by at least one of purposely using a higher latency for data communication, purposely sending more unreliable responses, pretending service unavailability, or purposely communicating deteriorated data content.
(7) The apparatus of any one of (5) to (6), wherein the processor circuit is configured to analyze the data transaction request, classify the at least one user account, and perform the data transactions in real-time.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method of fraud handling in an online data network including a fraud processing node having a processor and a memory storing instructions executed by the processor to perform the method of fraud handling, the method comprising:

receiving, at the processor of the fraud processing node via the data network, a data transaction request from at least one user account, the data transaction request including a request for digital content;

analyzing the data transaction request based on predefined fraud detection rules to generate a fraud score associated with the at least one user account;

classifying the at least one user account as fraudulent account if the associated fraud score exceeds a predefined fraud likelihood threshold; and performing, via the data network, data transactions associated with a classified fraudulent account that are degraded in comparison to data transactions associated with a classified nonfraudulent account, wherein degraded performance of data transactions associated with a classified fraudulent account includes modifying the requested digital content to an altered version of the digital content that is degraded in comparison to the requested digital content and providing the altered version of the digital content to the source of the data transaction request via the data network, wherein deteriorating the data transactions comprises at least one of purposely using a higher latency for data communication or communicating altered data content.

2. The method of claim 1, wherein analyzing the data transaction request comprises feeding the data transaction request from the at least one user account into a machine learning model configured to recognize fraudulent data transactions.

3. The method of claim 1, wherein performing data transactions comprises reacting in real-time to incoming data transaction requests.

4. An apparatus for fraud handling, comprising
a receiver configured to receive, via a data network, a data transaction request from at least one user account, the data transaction request including a request for digital content;

a processor circuit configured to analyze the data transaction request based on predefined fraud detection rules to generate a fraud score associated with the at least one user account;

classify the at least one user account as fraudulent account if the associated fraud score exceeds a predefined fraud likelihood threshold; and perform data transactions associated with a classified fraudulent account via the data network that are degraded in comparison to data transactions associated with a classified non-fraudulent account, wherein degraded performance of data transactions associated with a classified fraudulent account includes configuring the processor to modify the requested digital content to an altered version of the digital content that is degraded in comparison to the requested digital content and provide the altered version of the digital content to the source of the data transaction request via the data network, wherein deteriorating the data transactions comprises at least one of purposely using a higher latency for data communication or communicating altered data content.

5. The apparatus of claim 4, wherein the processor circuit is configured to analyze the data transaction request, classify the at least one user account, and perform the data transactions in real-time.

6. The method of claim 1, wherein the requested digital content is any one of a digital video or a digital game.

7. The apparatus of claim 4, wherein the requested digital content is any one of a digital video or a digital game.

\* \* \* \* \*